(12) United States Patent
Kong et al.

(10) Patent No.: US 12,277,059 B1
(45) Date of Patent: Apr. 15, 2025

(54) METHOD AND APPARATUS FOR REDUCING MIRROR DATA TRANSMISSION AMOUNT BY DUAL LAYER CACHE, AND DEVICE AND MEDIUM

(71) Applicant: Suzhou MetaBrain Intelligent Technology Co., Ltd., Jiangsu (CN)

(72) Inventors: Xiangfei Kong, Jiangsu (CN); Yonggang Wang, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/989,585

(22) Filed: Dec. 20, 2024

Related U.S. Application Data

(63) Continuation of application No. PCT/CN2023/115295, filed on Aug. 28, 2023.

(30) Foreign Application Priority Data

Nov. 2, 2022 (CN) .......................... 202211361623.2

(51) Int. Cl.
*G06F 12/08* (2016.01)
*G06F 12/0811* (2016.01)

(52) U.S. Cl.
CPC .... *G06F 12/0811* (2013.01); *G06F 2212/286* (2013.01)

(58) Field of Classification Search
CPC ................................................. G06F 12/0811
See application file for complete search history.

(56) References Cited

U.S. PATENT DOCUMENTS

| 2003/0140197 A1* | 7/2003 | Vanderwiel | G06F 12/0822 |
| | | | 711/119 |
| 2021/0271393 A1 | 9/2021 | Lin | |
| 2021/0311651 A1 | 10/2021 | Wang et al. | |

FOREIGN PATENT DOCUMENTS

| CN | 106293520 A | 1/2017 |
| CN | 107797945 A | 3/2018 |
| CN | 110321301 A | 10/2019 |
| CN | 115422207 A | 12/2022 |

OTHER PUBLICATIONS

International Search Report cited in PCT/CN2023/115295, mailed Nov. 17, 2023, 5 pages.

(Continued)

*Primary Examiner* — Jae U Yu
(74) *Attorney, Agent, or Firm* — Cooper Legal Group, LLC

(57) ABSTRACT

The present application discloses a method and apparatus for reducing a mirror data transmission amount by a dual layer cache, and a device and a medium. The method includes: after receiving an input/output (IO) request, writing, by a first node, the IO request into a first upper-layer cache space; writing, by the first node, first cached data corresponding to the IO request into a first lower-layer cache space according to the IO request, and generating, by the first node, first index information for the first cached data; writing mirror data of the IO request into a second upper-layer cache space of a second node; and writing mirror data of the first index information into a second lower-layer cache space of the second node.

20 Claims, 9 Drawing Sheets

(56) References Cited

OTHER PUBLICATIONS

Written Opinion cited in PCT/CN2023/115295, mailed Nov. 17, 2023, 6 pages.
First Office Action cited in CN202211361623.2, mailed Dec. 13, 2022, 10 pages.
Notification to Grant Patent Right for Invention cited in CN202211361623.2, mailed Jan. 20, 2023, 3 pages.

* cited by examiner

METHOD AND APPARATUS FOR REDUCING MIRROR DATA TRANSMISSION AMOUNT BY DUAL LAYER CACHE, AND DEVICE AND MEDIUM

CROSS-REFERENCE TO RELATED APPLICATION

This application is a continuation of International Patent Application No. PCT/CN2023/115295, entitled "METHOD AND APPARATUS FOR REDUCING MIRROR DATA TRANSMISSION AMOUNT BY DUAL LAYER CACHE, AND DEVICE AND MEDIUM" and filed on Aug. 28, 2023, which claims priority to Chinese Patent Application No. 202211361623.2, entitled "METHOD AND APPARATUS FOR REDUCING MIRROR DATA TRANSMISSION AMOUNT BY DUAL LAYER CACHE, AND DEVICE AND MEDIUM" and filed with the China National Intellectual Property Administration on Nov. 2, 2022. International Patent Application No. PCT/CN2023/115295 and Chinese Patent Application No. 202211361623.2 are incorporated herein by reference in their entireties.

FIELD

The present application relates to the technical field of data transmission, and in particular, to a method and apparatus for reducing mirror data transmission amount by dual layer cache, and a device and a medium.

BACKGROUND

In existing design, a dual-controller storage device is commonly used to enhance performance of a system by increasing a response speed of processing an input/output (IO) request, thereby boosting performance of a storage system.

However, inventors have realized that for a dual-controller system, a cache mirroring technology is generally employed to protect cached data. A basic principle is that consistent dirty data copies are stored in cache spaces of two controllers. When one controller fails (data in its cache space is unavailable), the other controller may still provide a corresponding data access. However, during processing of a received IO request, a significant amount of data needs to be transmitted between the two controllers to ensure that identical data is stored in the cache spaces corresponding to the two controllers. If a non-transparent bridge (NTB) of the dual-controller storage device is fixed, the cache spaces corresponding to the two controllers require mirror data, whereby there will be a situation that data transmission is queued and waits to pass through the NTB. As a result, the data transmission is slow. This may become a performance bottleneck for the system.

SUMMARY

According to a first aspect, the present application provides a method for reducing a mirror data transmission amount by a dual layer cache. The method includes:
dividing a cache space corresponding to a first node into a first upper-layer cache space and a first lower-layer cache space, and dividing a cache space corresponding to a second node into a second upper-layer cache space and a second lower-layer cache space;
after the first node receives an input/output (IO) request, writing, by the first node, the IO request into the first upper-layer cache space;
writing, by the first node, first cached data corresponding to the IO request into the first lower-layer cache space according to the IO request, and generating, by the first node, first index information for the first cached data, where the first index information points to the first cached data;
writing mirror data of the IO request in the first upper-layer cache space of the first node into the second upper-layer cache space of the second node; and
writing mirror data of the first index information in the first lower-layer cache space of the first node into the second lower-layer cache space of the second node.

In some embodiments, setting the first upper-layer cache space and the second upper-layer cache space to be a same size, namely, their spatial sizes are mirrored to each other; the IO request is written into the first upper-layer cache space and the second upper-layer cache space; setting the first lower-layer cache space and the second lower-layer cache space to be a same size, namely, their spatial sizes are mirrored to each other; and the cached data corresponding to the IO request and the index information pointing to the cached data are written into the first lower-layer cache space and the second lower-layer cache space.

In some embodiments, the IO request includes a write request and a read request; in response to the IO request being the write request, the first cached data is written data; and in response to the IO request being the read request, the first cached data is read data.

In some embodiments, after a step of the writing mirror data of the first index information in the first lower-layer cache space of the first node into the second lower-layer cache space of the second node, the method further includes:
after the second node receives the IO request, searching, by the second node according to the first index information, for the first cached data stored in the first lower-layer cache space of the first node.

In some embodiments, a step of the searching, by the second node according to the first index information, for the first cached data stored in the first lower-layer cache space of the first node includes:
receiving, by the second node, the IO request sent by a requesting end, where the IO request includes an identification of data to be read when the IO request is the read request;
searching, by the second node, for index information of data to be read from the first index information according to the identification of data to be read of the read request; and
sending, by the second node, data pointed to by the index information of the data to be read to the requesting end.

In some embodiments, the generating, by the first node, first index information for the first cached data includes:
setting the first index information to include a memory number pointing to a storage position of the first cached data;
interpolating, by the first node, the first index information in front of a starting position of the first cached data in the first lower-layer cache space; and
adding, by the first node, the memory number into a first index table.

In some embodiments, storing, within the first lower-layer cache space of the first node, the first cached data in a unit of fixed byte of memory; each fixed byte of memory corresponds to an integer value; and numbering a memory at the storage position of the first cached data to form the memory number.

In some embodiments, during the writing mirror data of the IO request in the first upper-layer cache space of the first node into the second upper-layer cache space of the second node, mirroring is performed according to the fixed byte of memory; and transmitting data with a fixed byte length at each mirroring.

In some embodiments, the generating, by the first node, first index information for the first cached data further includes: setting the first index information to include a data type identification of the first cached data, where when the IO request is the write request, the data type identification is a written data identification; when the IO request is the read request, the data type identification is a read data identification; and adding, by the first node, the data type identification into the first index table.

In some embodiments, where after receiving the IO request from the first upper-layer cache space of the first node, the first upper-layer cache space of the first node of a dual-controller storage device mirrors the IO request to the second upper-layer cache space of the second node.

In some embodiments, where after the first upper-layer cache of the first node mirrors the IO request to the second upper-layer cache of the second node, the method further includes:

after writing the mirror data of the IO request into the second upper-layer cache space of the second node, recording, by the upper-layer cache space of the second node, a memory number of a peer node corresponding to a memory number of the second node; and mirroring a message to the first node to prompt the first node.

In some embodiments, where after the mirroring a message to the first node to prompt the first node, the method further includes:

after receiving a mirrored message, recording, by the first node, data received according to the IO request into the cache space of the first node, and recording the memory number of the peer node corresponding to a memory number of the first node.

In some embodiments, after a step of writing mirror data of the first index information in the first lower-layer cache space of the first node into the second lower-layer cache space of the second node, the method further includes:

when receiving a command for clearing cache records, clearing, by the first node, cache data labeled with the read data identification from the first cached data; and when receiving the command for clearing the cache records, clearing, by the second node, invalid data which does not point to the first cached data from the first index information.

In some embodiments, after a step of writing mirror data of the first index information in the first lower-layer cache space of the first node into the second lower-layer cache space of the second node, the method further includes:

verifying, by reading the first index information in the second lower-layer cache space of the second node, whether the first cached data in the first lower-layer cache space of the first node is found.

In some embodiments, the method for reducing the mirror data transmission amount by the dual layer cache further includes:

dividing a cache space corresponding to a third node into a third upper-layer cache space and a third lower-layer cache space;

after the first node receives the IO request, writing, by the first node, the mirror data of the IO request in the first upper-layer cache space of the first node into the third upper-layer cache space of the third node;

writing the mirror data of the first index information in the first lower-layer cache space of the first node into the third lower-layer cache space of the third node; and in response to a failure of the second node, clearing cache records of the second node, and synchronizing the first index information of the third node with the first cached data of the first node.

In some embodiments, during the dividing a cache space corresponding to a third node into a third upper-layer cache space and a third lower-layer cache space, setting the third upper-layer cache space to be a same size as the first upper-layer cache space, and setting the third lower-layer cache space to be a same size as the first lower-layer cache space.

In some embodiments, after a step of the writing the mirror data of the first index information in the first lower-layer cache space of the first node into the third lower-layer cache space of the third node, the method further includes:

verifying, by reading the first index information in the third lower-layer cache space of the third node, whether the first cached data in the first lower-layer cache space of the first node is found.

In some embodiments, the step of searching, by the second node according to the first index information, for the first cached data stored in the first lower-layer cache space of the first node includes:

receiving, by the second node, the IO request sent by a requesting end, where the IO request includes an identification of data to be written when the IO request is the write request;

searching, by the second node, for index information of data to be written from the first index information according to the identification of data to be written of the write request; and sending, by the second node, data pointed to by the index information of the data to be written to the requesting end.

According to another aspect, the present application provides an apparatus for reducing mirror data transmission amount by a dual layer cache. The apparatus includes:

a cache space division module, configured for: dividing a cache space corresponding to a first node into a first upper-layer cache space and a first lower-layer cache space, and dividing a cache space corresponding to a second node into a second upper-layer cache space and a second lower-layer cache space;

an IO request writing module, configured for: after receiving an IO request, write, by the first node, the IO request into the first upper-layer cache space;

a data caching processing module, configured for: writing, by the first node, first cached data corresponding to the IO request into the first lower-layer cache space according to the IO request, and generating, by the first node, first index information for the first cached data, where the first index information points to the first cached data;

an IO request mirroring processing module, configured for writing mirror data of the IO request in the first upper-layer cache space of the first node into the second upper-layer cache space of the second node; and an index information mirroring processing module, configured for writing mirror data of the first index information in the first lower-layer cache space of the first node into the second lower-layer cache space of the second node.

According to another aspect, the present application provides a computer device, including one or more memories, one or more processors, and computer-readable instructions stored on the one or more memories and executable on the one or more processors. The one or more processors, when executing the computer-readable instructions, implement the steps of the above method for reducing mirror data transmission amount by a dual layer cache.

According to yet another aspect, the present application provides a non-volatile computer-readable storage medium, having computer-readable instructions stored thereon. The computer-readable instructions, when executed by one or more processors, implement the steps of the above method for reducing mirror data transmission amount by a dual layer cache.

BRIEF DESCRIPTION OF THE DRAWINGS

For clearer descriptions of technical solutions according to the embodiments of the present application, drawings required to be used in description of the embodiments are briefly introduced below. It is obvious that the drawings in the description below are some embodiments of the present application, and it is obvious for those skilled in the art that other drawings may be acquired according to the drawings without creative efforts.

DETAILED DESCRIPTION

In order to make objectives, technical solutions, and advantages of the present application clearer, followings are further detailed explanations of the present application in conjunction with accompanying drawings and embodiments. It should be understood that the embodiments described here are intended to explain the present application and are not intended to limit the present application.

Figure 1:
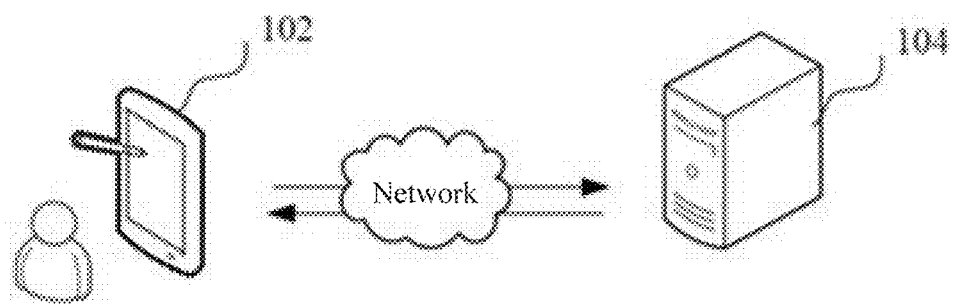
FIG. 1 is a diagram of an application environment of a method for reducing a mirror data transmission amount by the dual layer cache in one or more embodiments of the present application.

A method for reducing a mirror data transmission amount by a dual layer cache according to the present application may be applied to the application environment as shown in FIG. 1. A terminal 102 communicates with a computer device 104 through a network. The terminal 102 may be, but is not limited to, various personal computers, laptops, smartphones, tablets, and portable wearable devices. The computer device 104 may be implemented using an independent server or a server cluster composed of a plurality of servers. A dual-controller storage device is configured in the computer device 104. The dual-controller storage device includes a first controller and a second controller. The first controller serves as a first node, and the second controller serves as a second node. Both the first node and the second node include a first memory and a second memory. In some embodiments, an access speed of the first memory is higher than an access speed of the second memory. A storage capacity of the second memory is greater than a storage capacity of the first memory. In some embodiments, the second memory is a memory with power down protection function. The first memory may be a Dynamic Random Access Memory (DRAM). The second memory may be a Compute Express Link (CXL) memory or a Storage Class Memory (SCM).

Figure 2:
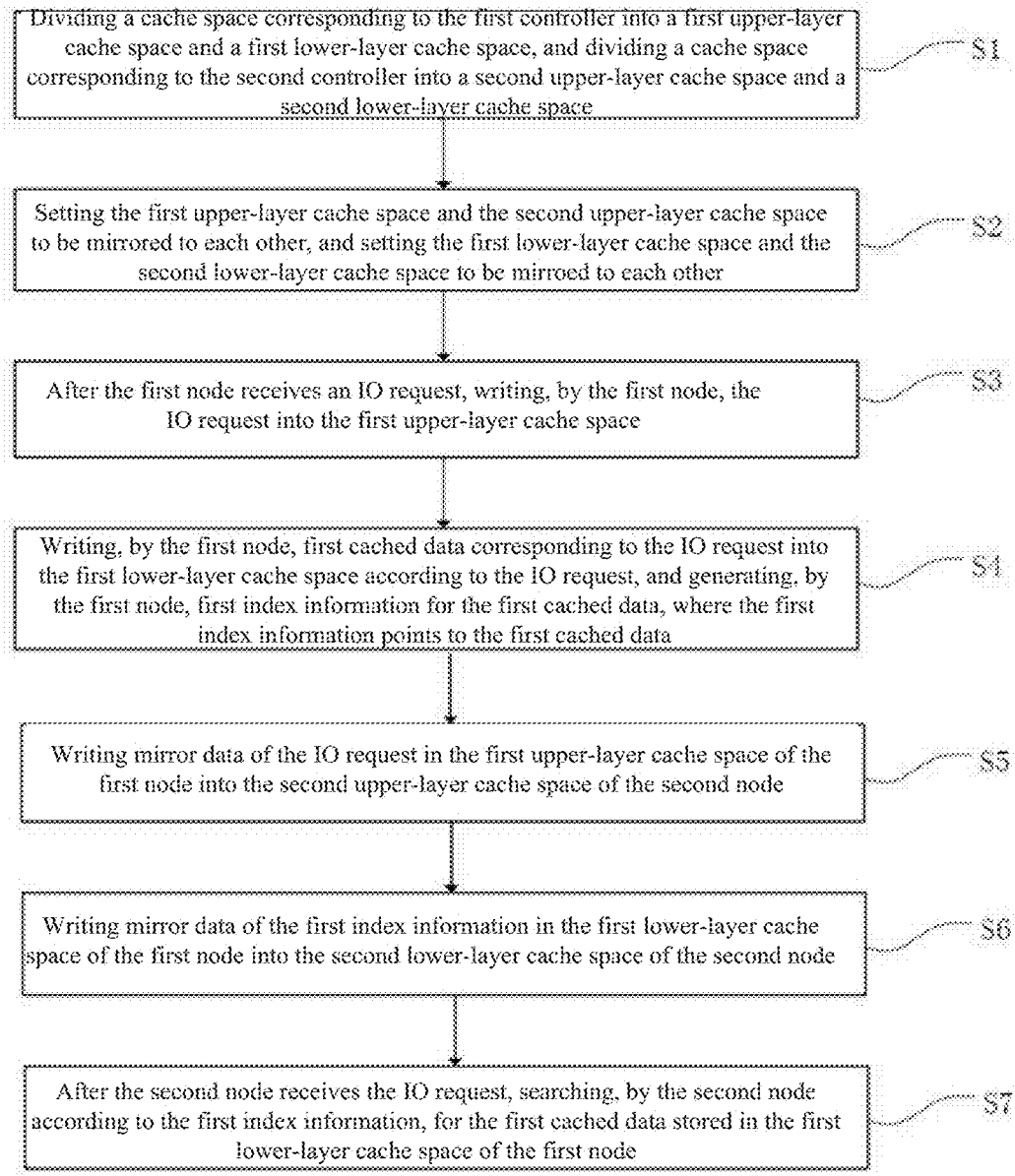
FIG. 2 is a flowchart of the method for reducing the mirror data transmission amount by the dual layer cache in one or more embodiments of the present application.

As shown in FIG. 2, some embodiments of the present application provide the method for reducing the mirror data transmission amount by the dual layer cache, applied to the dual-controller storage device. Application of the method to the computer device 104 in FIG. 1 is taken as an example for explanation. The method includes following steps:

Step S1, dividing a cache space corresponding to a first node into a first upper-layer cache space and a first lower-layer cache space, and dividing a cache space corresponding to a second node into a second upper-layer cache space and a second lower-layer cache space.

Figure 10:
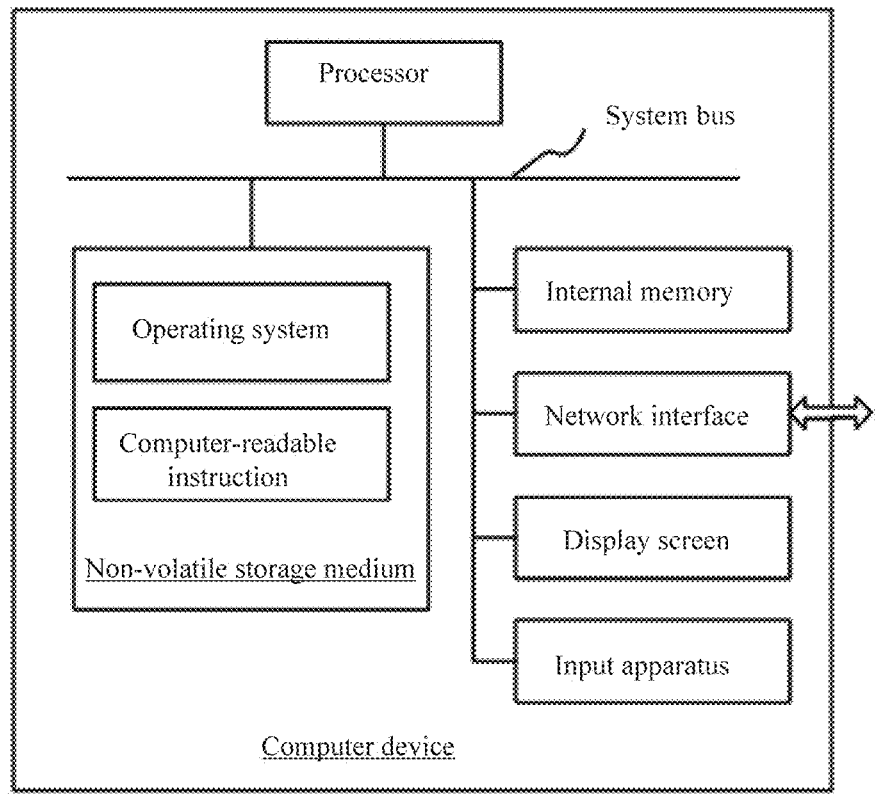
FIG. 10 is a diagram of an internal structure of a computer device in one or more embodiments of the present application.
Figure 11:
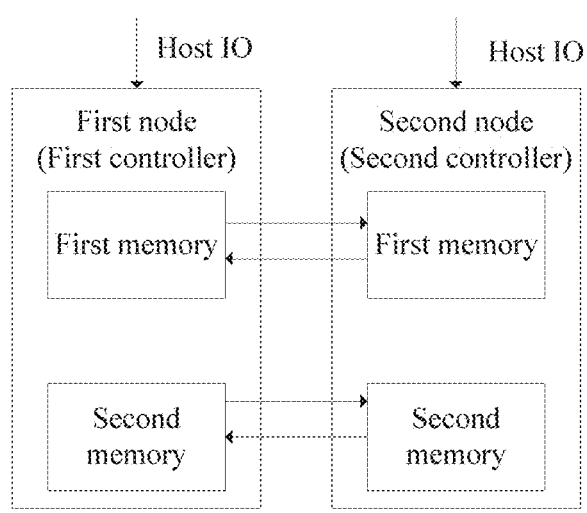
FIG. 11 is a diagram of another internal structure of the computer device in one or more embodiments of the present application.

As shown in FIG. 10, request the first node for the first memory as the first upper-layer cache space, and request the first node for the second memory as the first lower-layer cache space. Request the second node for the first memory as the second upper-layer cache space, and request the second node for the second memory as the second lower-layer cache space. In this way, the first upper-layer cache space and the second upper-layer cache space have a characteristic of a fast access speed. The first lower-layer cache space and the second lower-layer cache space have the characteristics of high capacity and power failure protection.

Step S2, setting the first upper-layer cache space and the second upper-layer cache space to be a same size, that is, space sizes are mirrored to each other, and an IO request is written into the first upper-layer cache space and the second upper-layer cache space; and setting the first lower-layer cache space and the second lower-layer cache space to be a same size, that is, space sizes are mirrored to each other, and cached data corresponding to the IO request and index information pointing to the cached data are written into the first lower-layer cache space and the second lower-layer cache space.

Step S3, after the first node receives the IO request, writing the IO request into the first upper-layer cache space. Due to the characteristic of the fast access speed of the first upper-layer cache space, the IO request may be quickly written into the first upper-layer cache space, to make a quick response to the IO request.

Step S4, writing, by the first node, first cached data corresponding to the IO request into the first lower-layer cache space according to the IO request, and generating, by the first node, first index information for the first cached data, where the first index information points to the first cached data.

Due to the characteristics of the high capacity and the power failure protection of the first lower-layer cache space, even if a data amount of the first cached data is large, the first cached data may be also stored, and the first cached data is not easily lost.

Step S5, writing mirror data of the IO request in the first upper-layer cache space of the first node into the second upper-layer cache space of the second node.

Due to the characteristic of the fast access speed of the second upper-layer cache space, the mirror data of the IO request may be quickly written into the second upper-layer cache space.

Step S6, writing mirror data of the first index information in the first lower-layer cache space of the first node into the second lower-layer cache space of the second node.

In some embodiments, the IO request includes a write request and a read request. When the IO request is the write request, the first cached data is written data; and when the IO request is the read request, the first cached data is read data.

As shown in FIG. 2, in some embodiments, after step S6 of the writing mirror data of the first index information in the first lower-layer cache space of the first node into the second lower-layer cache space of the second node, the method further includes:

Step S7, after the second node receives the IO request, searching, by the second node according to the first index information, for the first cached data stored in the first lower-layer cache space of the first node.

Figure 3:
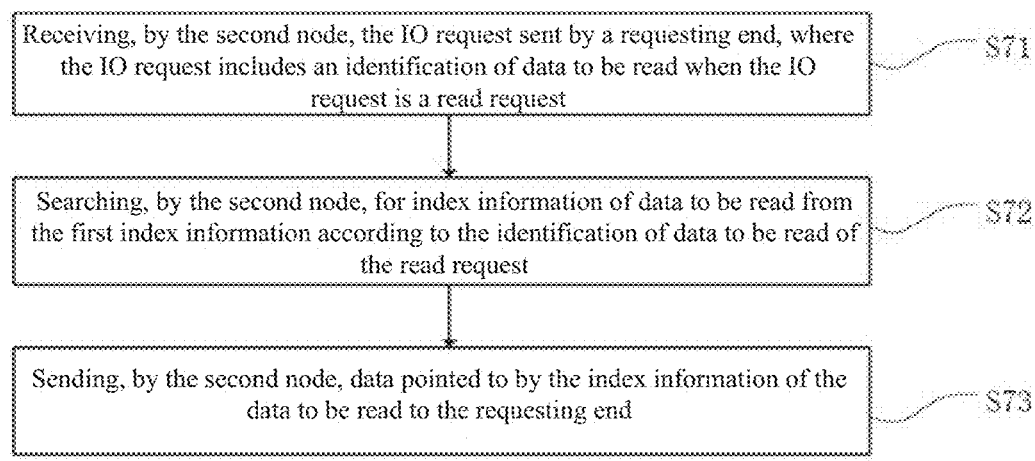
FIG. 3 is a flowchart of a step of searching, by a second node according to first index information, for first cached data stored in a first lower-layer cache space of a first node in one or more embodiments of the present application.

As shown in FIG. 3, in some embodiments, step S7 of searching, by the second node according to the first index information, for the first cached data stored in the first lower-layer cache space of the first node includes:

Step S71, receiving, by the second node, the IO request sent by a requesting end, where the IO request includes an identification of data to be read when the IO request is the read request;

Step S72, searching, by the second node, for index information of data to be read from the first index information according to the identification of data to be read of the read request; and Step S73, sending, by the second node, data pointed to by the index information of the data to be read to the requesting end.

In some embodiments, a step of searching, by the second node according to the first index information, for the first cached data stored in the first lower-layer cache space of the first node includes:

receiving, by the second node, the IO request sent by a requesting end, where the IO request includes an identification of data to be written when the IO request is the write request;
    searching, by the second node, for index information of data to be written from the first index information according to the identification of data to be written of the write request; and
    sending, by the second node, data pointed to by the index information of the data to be written to the requesting end.

It may be understood that to verify that the mirror data of the first index information in the second node is correct, after step S6 of writing mirror data of the first index information in the first lower-layer cache space of the first node into the second lower-layer cache space of the second node, the method further includes: verifying, by reading the first index information in the second lower-layer cache space of the second node, whether the first cached data in the first lower-layer cache space of the first node is found.

Figure 4:
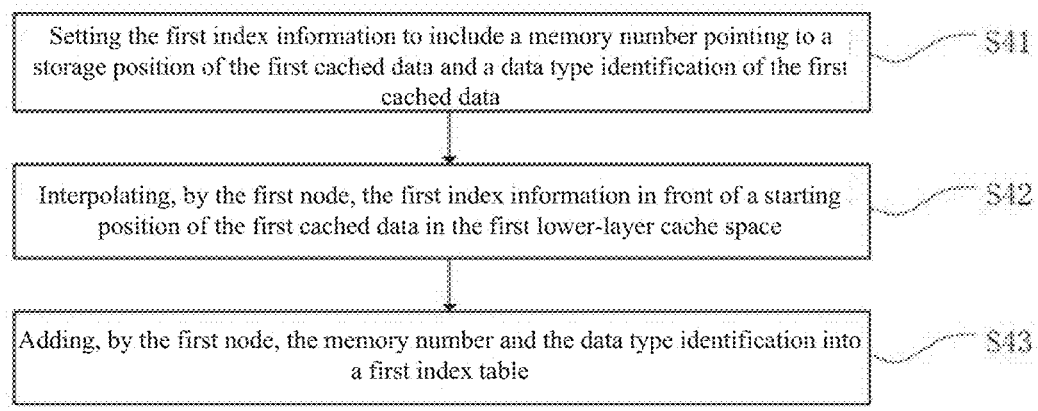
FIG. 4 is a flowchart of a step of generating, by a first node, the first index information for the first cached data in one or more embodiments of the present application.

As shown in FIG. 4, in some embodiments, the generating, by the first node, first index information for the first cached data includes:

Step S41, setting the first index information to include a memory number pointing to a storage position of the first cached data;

Step S42, interpolating, by the first node, the first index information in front of a starting position of the first cached data in the first lower-layer cache space; and Step S43, adding, by the first node, the memory number into a first index table.

In some embodiments, storing, within the first lower-layer cache space of the first node, the first cached data in a unit of fixed byte of memory; each fixed byte of memory corresponds to an integer value; and numbering a memory at the storage position of the first cached data to form the memory number.

In some embodiments, during the writing mirror data of the IO request in the first upper-layer cache space of the first node into the second upper-layer cache space of the second node, mirroring according to the fixed byte of memory, and transmitting data with a fixed byte length at each mirroring.

As shown in FIG. 4, in some embodiments, during the generating, by the first node, first index information for the first cached data, step S41 further includes: setting the first index information to include a data type identification of the first cached data, where when the IO request is the write request, the data type identification is a written data identification; when the IO request is the read request, the data type identification is a read data identification; and step S43 further includes: adding, by the first node, the data type identification into the first index table.

Therefore, as shown in FIG. 4, in step S41, the first index information is set to include the memory number pointing to the storage position of the first cached data and the data type identification of the first cached data. In step S43, the first node adds the memory number and the data type identification into the first index table.

For example, after receiving the IO request from an upper-layer module of the first node, the upper-layer cache of the first node of the double-controller storage device first mirrors the IO request to the upper-layer cache of the second node. The upper-layer cache of the second node records a memory number of a node of a peer end corresponding to the memory number of this node after writing the mirror data into the upper-layer cache of the second node. Then, the second node mirrors a message to the first node (while informing the first node of the memory number used by the second node). After receiving the mirrored message, the first node records the data received from the upper-layer IO request into the cache of the first node and records the memory number of the peer node corresponding to the memory number of this node. This completes memory recording. This is stored in a memory and may also be accessed by the lower-layer cache of this node. For the lower-layer cache, after receiving the IO request from the upper-layer module, when mirroring is required, the second node searches for a memory number of a first node of the peer end according to the memory number of the cached data corresponding to the IO request. If the memory number may be found, memory content will not be transmitted during mirroring, but only the memory number is transmitted, which greatly reduces a load on a mirroring channel.

Figure 5:
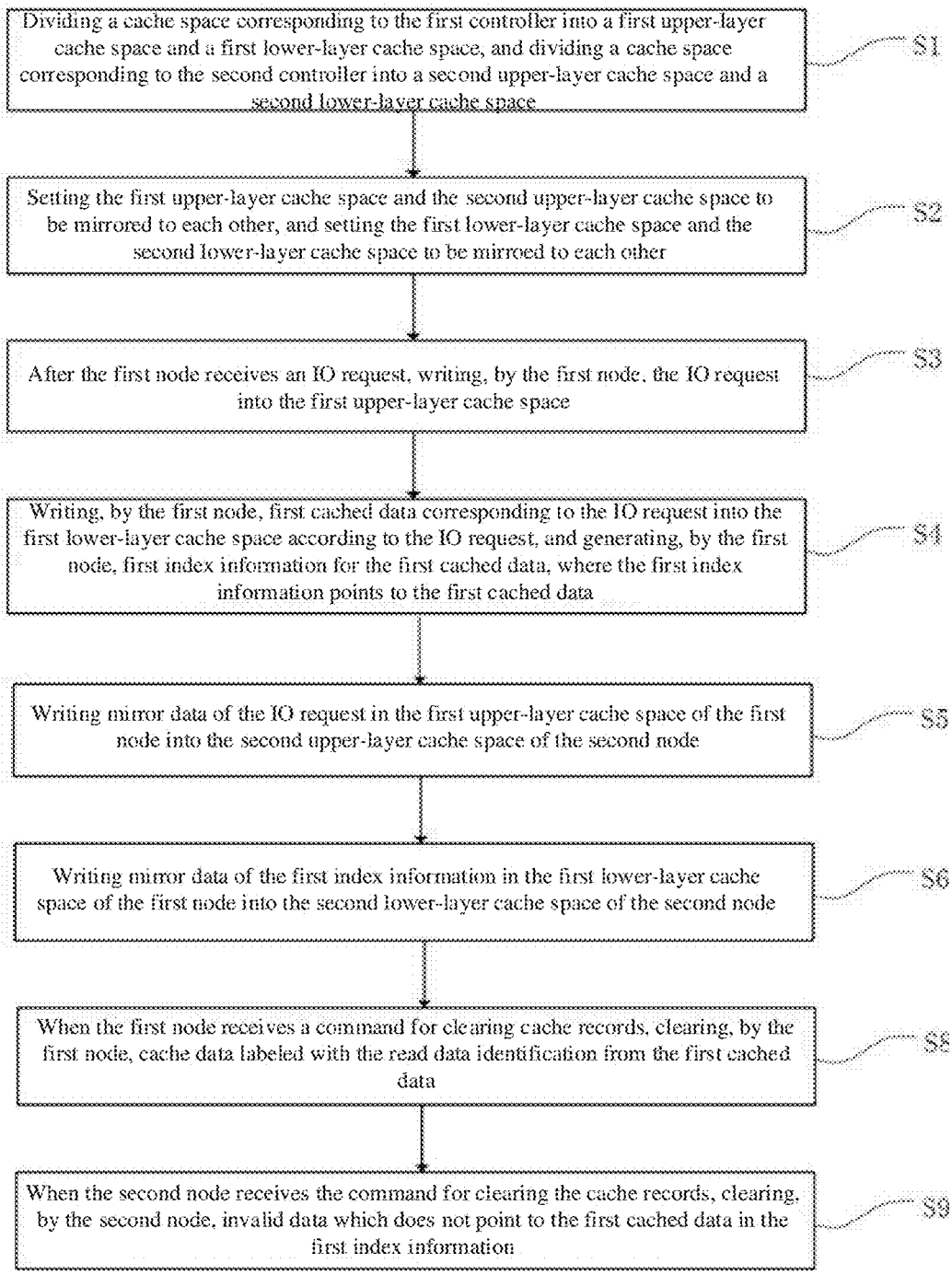
FIG. 5 is a flowchart of the method for reducing mirror data transmission amount by the dual layer cache according to another embodiment of the present application.

In some embodiments, as shown in FIG. 5, some other embodiments of the present application provide the method for reducing the mirror data transmission amount by the dual layer cache, applied to a dual-controller storage device. Application of the method to the computer device 104 in FIG. 1 is taken as an example for explanation. The method includes the following steps:

Step S1, dividing a cache space corresponding to a first node into a first upper-layer cache space and a first lower-layer cache space, and dividing a cache space corresponding to a second node into a second upper-layer cache space and a second lower-layer cache space.

Step S2, setting the first upper-layer cache space and the second upper-layer cache space to be a same size, that is, space sizes are mirrored to each other, and an IO request is written into the first upper-layer cache space and the second upper-layer cache space; and setting the first lower-layer cache space and the second lower-layer cache space to be a same size, where their spatial sizes are mirrored to each other, and cached data corresponding to the IO request and index information pointing to the cached data are written into the first lower-layer cache space and the second lower-layer cache space.

Step S3, after the first node receives the IO request, writing, by the first node, the IO request into the first upper-layer cache space.

Step S4, writing, by the first node, first cached data corresponding to the IO request into the first lower-layer cache space according to the IO request, and generating, by the first node, first index information for the first cached data, where the first index information points to the first cached data.

Step S5, writing mirror data of the IO request in the first upper-layer cache space of the first node into the second upper-layer cache space of the second node.

Step S6, writing mirror data of the first index information in the first lower-layer cache space of the first node into the second lower-layer cache space of the second node.

As shown in FIG. 5, in some embodiments of the present application, after step S6 of writing mirror data of the first index information in the first lower-layer cache space of the first node into the second lower-layer cache space of the second node, the method further includes:

Step S8, when the first node receives a command for clearing cache records, clearing, by the first node, cache data labeled with the read data identification from the first cached data; and Step S9, when the second node receives the command for clearing the cache records, clearing, by the second node, invalid data which does not point to the first cached data in the first index information.

In the method for reducing the mirror data transmission amount by the dual layer cache, the cache spaces corresponding to the first controller and the second controller of the dual-controller storage device are divided into dual-layer cache spaces. The dual-layer cache spaces include upper-layer cache spaces for writing the IO request and lower-layer cache spaces for writing the cached data corresponding to the IO request, and the index information pointing to the cached data. The upper-layer cache spaces of both the first controller and the second controller are of the same size, namely, their spatial sizes are mirrored to each other. The lower-layer cache spaces of both the first controller and the second controller are of the same size, namely, their spatial sizes are mirrored to each other. When the lower-layer cache space of the second controller mirrors the cached data in the lower-layer cache space of the first controller, memory content is not transmitted, but only the memory number is transmitted. This greatly reduces a load on a mirroring channel, thereby reducing the mirror data transmission amount, improving a response speed of processing the IO (input/output) request, and improving the performance of the system.

It is understood that although all the steps in the flowcharts of FIG. 2 to FIG. 5 are displayed in sequence according to the instructions of the arrows, these steps are not necessarily performed in sequence according to the sequence indicated by the arrows. Unless otherwise explicitly specified in the present application, execution of the steps is not strictly limited, and the steps may be performed in other sequences. Moreover, at least some of the steps in FIG. 2 to FIG. 5 may include a plurality of substeps or a plurality of stages. These substeps or stages are not necessarily performed at the same moment but may be performed at different moments. Execution of these substeps or stages is not necessarily performed in sequence, but may be performed in turn or alternately with other steps or substeps in other steps or at least some of the stages.

Figure 6:
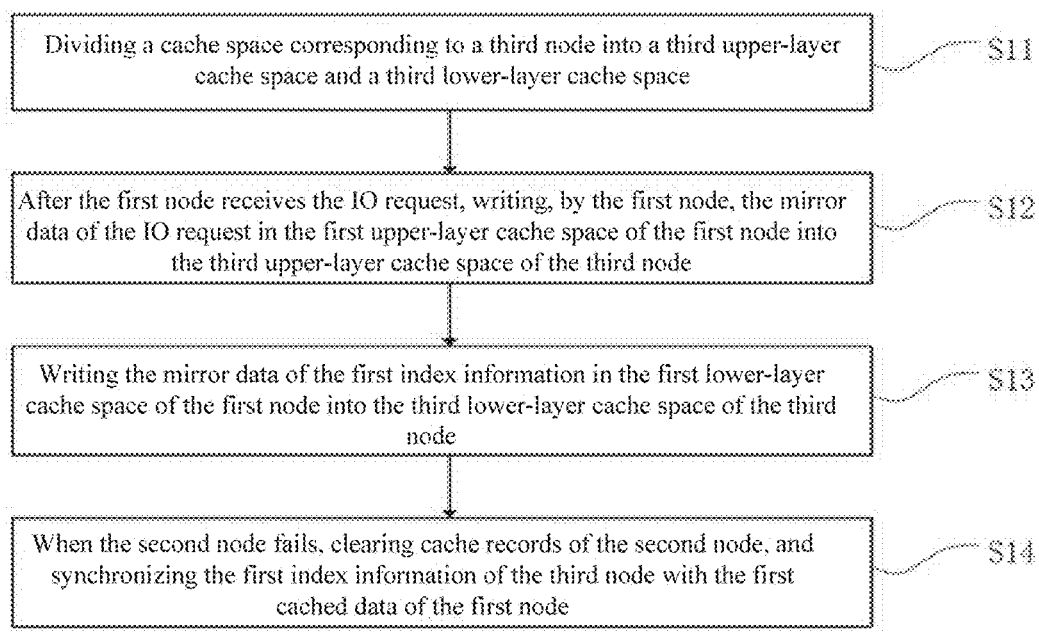
FIG. 6 is a partial flowchart of the method for reducing mirror data transmission amount by the dual layer cache in another embodiment of the present application.

As shown in FIG. 6, based on the above embodiment, the present application further provides some other embodiments. In some embodiments, the method for reducing the mirror data transmission amount by the dual layer cache further includes:

Step S11, dividing a cache space corresponding to a third node into a third upper-layer cache space and a third lower-layer cache space;

Step S12, after the first node receives the IO request, writing, by the first node, the mirror data of the IO request in the first upper-layer cache space of the first node into the third upper-layer cache space of the third node;

Step S13, writing the mirror data of the first index information in the first lower-layer cache space of the first node into the third lower-layer cache space of the third node; and Step S14, when the second node fails, clearing cache records of the second node, and synchronizing the first index information of the third node with the first cached data of the first node.

The third node means another node besides the second node. Meanwhile, the computer device 104 further includes a third controller, and the third controller serves as the third node. When any of the second node or the third node fails, cache records of the failed node will be cleared to ensure that the cache mirroring of the other two nodes may be synchronized.

In some embodiments, during the dividing a cache space corresponding to a third node into a third upper-layer cache space and a third lower-layer cache space, setting the third upper-layer cache space to be a same size as the first upper-layer cache space, and setting the third lower-layer cache space to be a same size as the first lower-layer cache space.

It may be understood that to verify that the mirror data of the first index information in the third node is correct, after a step of writing mirror data of the first index information in the first lower-layer cache space of the first node into the third lower-layer cache space of the third node, the method further includes: verifying, by reading the first index information in the third lower-layer cache space of the third node, whether the first cached data in the first lower-layer cache space of the first node is found.

A setting mode of the third node in some embodiments is exactly the same as the second node, and will not be elaborated here.

Figure 7:
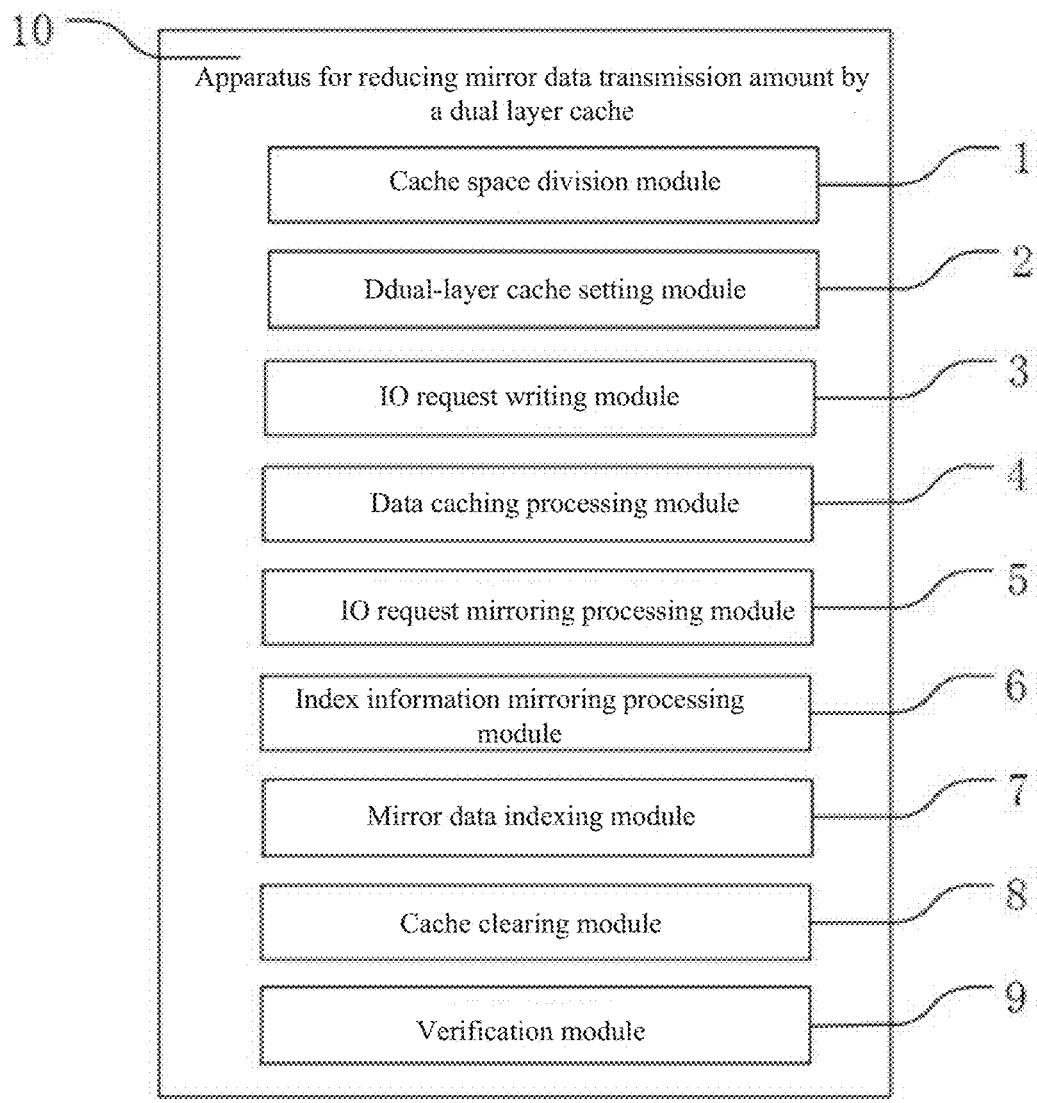
FIG. 7 is a structural block diagram of an apparatus for reducing the mirror data transmission amount by the dual layer cache in one or more embodiments of the present application.

As shown in FIG. 7, some embodiments of the present application provide an apparatus 10 for reducing the mirror data transmission amount by the dual layer cache, including: a cache space division module 1, a dual-layer cache setting module 2, an IO request writing module 3, a data caching processing module 4, an IO request mirroring processing module 5, and an index information mirroring processing module 6.

The cache space division module 1 is configured for: dividing a cache space corresponding to a first node into a first upper-layer cache space and a first lower-layer cache space, and dividing a cache space corresponding to a second node into a second upper-layer cache space and a second lower-layer cache space;

the dual-layer cache setting module 2 is configured for: setting the first upper-layer cache space and the second upper-layer cache space to be the same size, where their spatial sizes are mirrored to each other, and an IO request is written into the first upper-layer cache space and the second upper-layer cache space; and setting the first lower-layer cache space and the second lower-layer cache space to be the same size, where their spatial sizes are mirrored to each other, and cached data corresponding to the IO request and index information pointing to the cached data are written into the first lower-layer cache space and the second lower-layer cache space.

the IO request writing module 3 is configured for: after the first node receives an IO request, writing, by the first node, the IO request into the first upper-layer cache space;

the data caching processing module 4 is configured for: writing, by the first node, first cached data corresponding to the IO request into the first lower-layer cache space according to the IO request, and generating, by the first node, first index information for the first cached data, where the first index information points to the first cached data;

the IO request mirroring processing module 5 is configured for writing mirror data of the IO request in the first upper-layer cache space of the first node into the second upper-layer cache space of the second node; and the index information mirroring processing module 6 is configured for writing mirror data of the first index information in the first lower-layer cache space of the first node into the second lower-layer cache space of the second node.

In some embodiments, the IO request includes a write request and a read request. When the IO request is the write request, the first cached data is written data; and when the IO request is the read request, the first cached data is read data.

As shown in FIG. 7, in some embodiments, the apparatus 10 for reducing the mirror data transmission amount by the dual layer cache further includes: a mirror data indexing module 7, configured for: after the second node receives the IO request, searching, by the second node according to the first index information, for the first cached data stored in the first lower-layer cache space of the first node.

Figure 8:
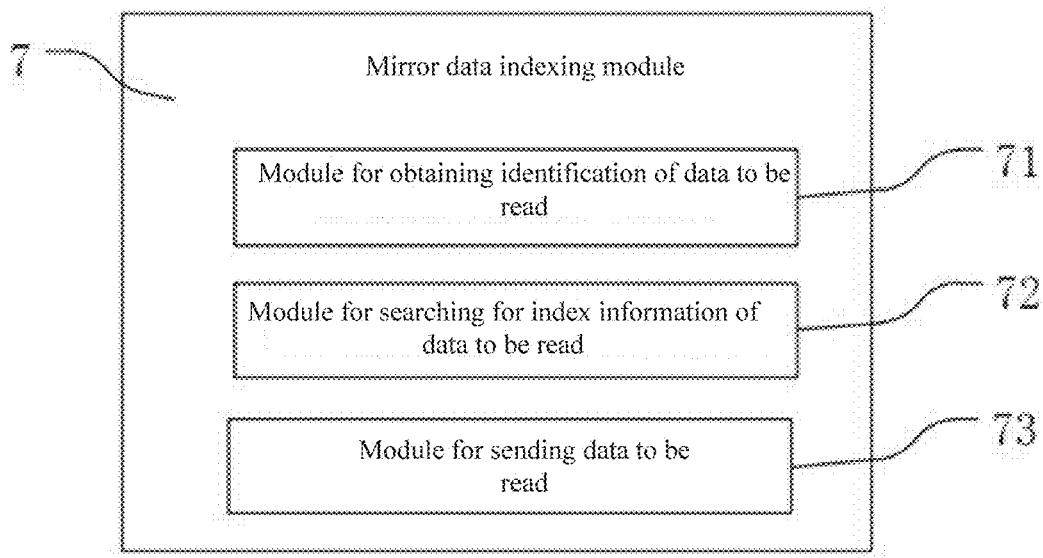
FIG. 8 is a structural block diagram of a mirror data indexing module in one or more embodiments of the present application.

As shown in FIG. 8, the mirror data indexing module 7 includes: a module 71 for obtaining identification of data to be read, a module 72 for searching for index information of data to be read, and a module 73 for sending data to be read.

The module 71 for obtaining identification of data to be read is configured for obtaining, when the IO request received by the second node and sent by the requesting end is a read request, an identification of data to be read in the read request.

The module 72 for searching for index information of data to be read is configured for controlling the second node to search for index information of data to be read from the first index information according to the identification of data to be read of the read request.

The module 73 for sending data to be read is configured for controlling the second node to send data pointed to by the index information of the data to be read to the requesting end.

In some embodiments, the mirror data indexing module 7 includes: a module for obtaining identification of data to be written, a module for searching for index information of data to be written, and a module for sending data to be written.

The module for obtaining identification of data to be written is configured for obtaining, when the IO request received by the second node and sent by the requesting end is a write request, an identification of data to be written in the write request.

The module for searching for index information of data to be written is configured for controlling the second node to search for index information of data to be written from the first index information according to the identification of data to be written of the write request.

The module for sending data to be written is configured for sending, by the second node, data pointed to by the index information of the data to be written to the requesting end.

Figure 9:
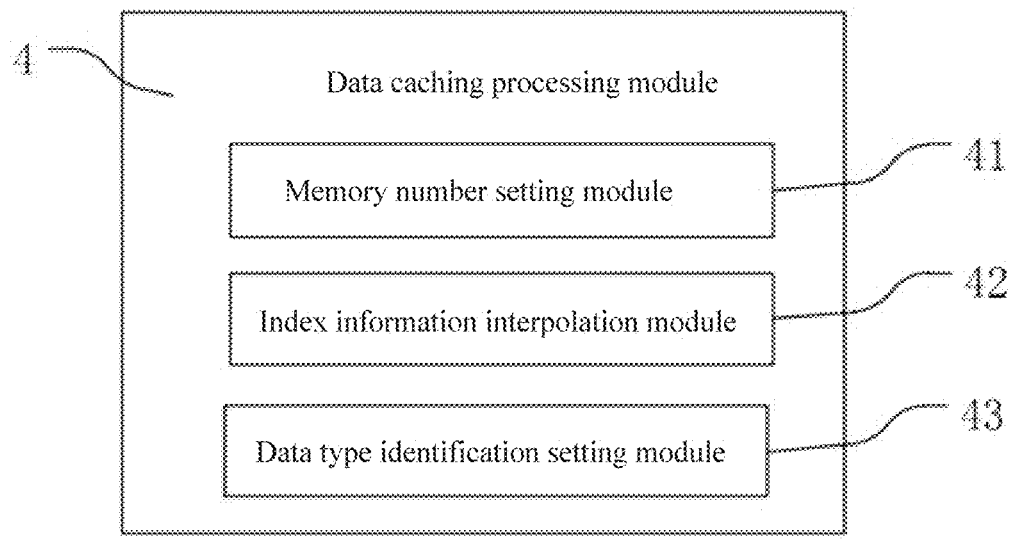
FIG. 9 is a structural block diagram of a data caching processing module in one or more embodiments of the present application.

In some embodiments, as shown in FIG. 9, the data caching processing module 4 includes: a memory number setting module 41, an index information interpolation module 42, a data type identification setting module 43, and an index table generation module 44.

The memory number setting module 41 is configured for setting the first index information to include a memory number pointing to a storage position of the first cached data.

The index information interpolation module 42 is configured for controlling the first node to interpolate the first index information in front of a starting position of the first cached data in the first lower-layer cache space.

The data type identification setting module 43 is configured for setting the first index information to include a data type identification of the first cached data, where when the IO request is the write request, the data type identification is a written data identification; when the IO request is the read request, the data type identification is a read data identification.

The index table generation module 44 is configured for controlling the first node to add the memory number and the data type identification into a first index table.

In some embodiments, the first cached data is stored in the first lower-layer cache space of the first node in a unit of fixed byte of memory; each fixed byte of memory corresponds to an integer value; and a memory at the storage position of the first cached data is numbered to form the memory number.

In some embodiments, during the writing mirror data of the IO request in the first upper-layer cache space of the first node into the second upper-layer cache space of the second node, mirroring is performed according to a fixed byte of memory; and data with a fixed byte length is transmitted at each mirroring.

As shown in FIG. 7, in some embodiments, the apparatus 10 for reducing the mirror data transmission amount by the dual layer cache further includes: a cache clearing module 8. The cache clearing module 8 is configured for: when the first node receives a command for clearing cache records, controlling the first node to clear cache data labeled with the read data identification from the first cached data; and the cache clearing module 8 is further configured for: when the second node receives the command for clearing the cache records, controlling the second node to clear invalid data which does not point to the first cached data from the first index information.

As shown in FIG. 7, in some embodiments, the apparatus 10 for reducing the mirror data transmission amount by the dual layer cache further includes: a verification module 9. The verification module 9 is configured for verifying, by reading the first index information in the second lower-layer cache space of the second node, whether the first cached data in the first lower-layer cache space of the first node is found.

In some embodiments, the cache space division module 1 is further configured for dividing a cache space corresponding to a third node into a third upper-layer cache space and a third lower-layer cache space.

The IO request mirroring processing module 5 is further configured for: after the first node receives the IO request, writing the mirror data of the IO request in the first upper-layer cache space of the first node into the third upper-layer cache space of the third node.

The index information mirroring processing module 6 is further configured for writing the mirror data of the first index information in the first lower-layer cache space of the first node into the third lower-layer cache space of the third node.

The cache clearing module 8 is further configured for: when the second node fails, clearing the cache records of the second node. The mirror data indexing module 7 is further configured for synchronizing the first index information of the third node with the first cached data of the first node.

The dual-layer cache setting module 2 is further configured for: during the dividing a cache space corresponding to a third node into a third upper-layer cache space and a third lower-layer cache space, setting the third upper-layer cache space to be the same size as the first upper-layer cache space, and setting the third lower-layer cache space to be the same size as the first lower-layer cache space.

The verification module 9 is further configured for verifying, by reading the first index information in the third lower-layer cache space of the third node, whether the first cached data in the first lower-layer cache space of the first node is found.

In the apparatus for reducing the mirror data transmission amount by the dual layer cache, the cache spaces corresponding to the first controller and the second controller of the dual-controller storage device are divided into dual-layer cache spaces. The dual-layer cache spaces include upper-layer cache spaces for writing the IO request and lower-layer cache spaces for writing the cached data corresponding to the IO request, and the index information pointing to the cached data. The upper-layer cache spaces of both the first controller and the second controller are of the same size, namely, their spatial sizes are mirrored to each other. The lower-layer cache spaces of both the first controller and the second controller are of the same size, namely, their spatial sizes are mirrored to each other. When the lower-layer cache space of the second controller mirrors the cached data in the lower-layer cache space of the first controller, memory content is not transmitted, but only the memory number is transmitted. This greatly reduces a load on a mirroring channel, thereby reducing the mirror data transmission amount, improving a response speed of processing the IO (input/output) request, and improving the performance of the system.

Limitations of the apparatus for reducing the mirror data transmission amount by the dual layer cache may be found in the above limitations on the method for reducing the mirror data transmission amount by the dual layer cache, which will not be elaborated here. The modules in the apparatus for reducing the mirror data transmission amount by the dual layer cache may be implemented entirely or partially through software, hardware, or a combination of software and hardware. The above modules may be embedded in or independent of one or more processors in a computer device in a hardware form, or stored in one or more memories in the computer device in a software form, for the one or more processors to invoke and execute the operations corresponding to the above modules.

In some embodiments, a computer device is provided. The computer device may be a server, a diagram of an internal structure of which may be as shown in FIG. 10. The computer device includes one or more processors, one or more memories, a network interface, and a database which are connected through a system bus. The one or more processors of the computer device is configured for providing computation and control abilities. The one or more memories of the computer device includes a non-volatile storage medium and an internal memory. The non-volatile storage medium stores an operating system, computer-readable instructions, and a database. The internal memory provides an environment for running the operating system and the computer-readable instructions in the non-volatile storage medium. The database of the computer device is configured for storing data of the apparatus for reducing the mirror data transmission amount by the dual layer cache. The network interface of the computer device is used for communicating with an external terminal through network connection. The computer-readable instructions, when executed by one or more processors, implement the method for reducing the mirror data transmission amount by the dual layer cache.

A person skilled in the art may understand that, the structure shown in FIG. 10 is merely a block diagram of partial structures related to a solution in the present application, and does not constitute a limitation on the computer device to which the solution of the present application is applied. In some embodiments, the computer device may include more components or fewer components than those shown in the figure, or some components may be combined, or a different component deployment may be used.

In some embodiments, a computer device is provided, including one or more memories, one or more processors, and computer-readable instructions stored on the one or more memories and executable on the one or more processors. The one or more processors, when executing the computer-readable instructions, implement the steps of the above method for reducing the mirror data transmission amount by the dual layer cache.

In some embodiments, a non-volatile computer-readable storage medium is provided, having computer-readable instructions stored thereon. The computer-readable instructions, when executed by one or more processors, implement the steps of the above method for reducing the mirror data transmission amount by the dual layer cache.

A person of ordinary skill in the art may understand that all or some of the procedures of the method in the foregoing embodiments may be implemented by the computer-readable instructions that instruct relevant hardware. The computer-readable instructions may be stored in a non-volatile computer-readable storage medium. When the computer-readable instructions are executed, the procedures of the foregoing method embodiments may be implemented. Any reference to the memory, the database, or other media used in the embodiments provided in the present application may include a non-volatile memory and/or a volatile memory. The non-volatile memory may include a read-only (ROM), a programmable ROM (PROM), an electrically programmable ROM (EPROM), an electrically erasable programmable ROM (EEPROM), or a flash memory. The volatile memory may include a random access (RAM) or an external cache memory. As an illustration and not a limitation, the RAM may be obtained in various forms, such as a static RAM (SRAM), a dynamic RAM (DRAM), a synchronous DRAM (SDRAM), a dual data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

All the technical features of the above embodiments may be combined randomly. For the sake of brevity, all possible combinations of all the technical features in the above embodiments are not described. However, these technical features shall all be considered to fall within the scope of this specification as long as there is no contradiction in their combinations.

The foregoing embodiments merely express several implementations of the present application. The descriptions thereof are relatively specific and detailed, but are not understood as limitations on the scope of the patent of the application. A person of ordinary skill in the art may also make several transformations and improvements without departing from the idea of the present application. These transformations and improvements fall within the protection scope of the present application. Therefore, the protection scope of the patent of the present application shall be subject to the appended claims.

The invention claimed is:

1. A method for reducing a mirror data transmission amount by a dual layer cache, comprising following steps:
    dividing a cache space corresponding to a first node into a first upper-layer cache space and a first lower-layer cache space, and dividing a cache space corresponding to a second node into a second upper-layer cache space and a second lower-layer cache space;
    after the first node receives an input/output (IO) request, writing the IO request into the first upper-layer cache space;
    writing, by the first node, first cached data corresponding to the IO request into the first lower-layer cache space according to the IO request, and generating, by the first node, first index information for the first cached data, wherein the first index information points to the first cached data;
    writing mirror data of the IO request in the first upper-layer cache space of the first node into the second upper-layer cache space of the second node; and
    writing mirror data of the first index information in the first lower-layer cache space of the first node into the second lower-layer cache space of the second node, and not transmitting the first cached data to the second lower-layer cache space of the second node.

2. The method for reducing the mirror data transmission amount by the dual layer cache according to claim 1, wherein during the dividing a cache space corresponding to a first node into a first upper-layer cache space and a first lower-layer cache space, and dividing a cache space corresponding to a second node into a second upper-layer cache space and a second lower-layer cache space,
    setting the first upper-layer cache space and the second upper-layer cache space to be a same size, and
    setting the first lower-layer cache space and the second lower-layer cache space to be a same size.

3. The method for reducing the mirror data transmission amount by the dual layer cache according to claim 1, wherein the IO request comprises a write request or a read request;
    in response to the IO request being the write request, the first cached data is written data; and
    in response to the IO request being the read request, the first cached data is read data.

4. The method for reducing the mirror data transmission amount by the dual layer cache according to claim 3, wherein after the writing mirror data of the first index information in the first lower-layer cache space of the first node into the second lower-layer cache space of the second node, the method further comprises:
    after the second node receives the IO request, searching, by the second node according to the first index information, for the first cached data stored in the first lower-layer cache space of the first node.

5. The method for reducing the mirror data transmission amount by the dual layer cache according to claim 4, wherein the searching, by the second node according to the first index information, for the first cached data stored in the first lower-layer cache space of the first node comprises:
    receiving, by the second node, the IO request sent by a requesting end, wherein the IO request comprises an identification of data to be read when the IO request is the read request;
    searching, by the second node, for index information of data to be read from the first index information according to the identification of data to be read of the read request; and
    sending, by the second node, data pointed to by the index information of the data to be read to the requesting end.

6. The method for reducing the mirror data transmission amount by the dual layer cache according to claim 3, wherein the generating, by the first node, first index information for the first cached data comprises:
    setting the first index information to comprise a memory number pointing to a storage position of the first cached data;
    interpolating, by the first node, the first index information in front of a starting position of the first cached data in the first lower-layer cache space; and
    adding, by the first node, the memory number into a first index table.

7. The method for reducing the mirror data transmission amount by the dual layer cache according to claim 6, wherein
    storing, within the first lower-layer cache space of the first node, the first cached data in a unit of fixed byte of memory; each fixed byte of memory corresponds to an integer value; and
    numbering a memory at the storage position of the first cached data to form the memory number.

8. The method for reducing the mirror data transmission amount by the dual layer cache according to claim 7, during the writing mirror data of the IO request in the first upper-layer cache space of the first node into the second upper-layer cache space of the second node, mirroring according to the fixed byte of memory, and transmitting data with a fixed byte length at each mirroring.

9. The method for reducing the mirror data transmission amount by the dual layer cache according to claim 6, wherein the generating, by the first node, first index information for the first cached data further comprises:
setting the first index information to comprise a data type identification of the first cached data, wherein under a condition that the IO request is the write request, the data type identification is a written data identification; under a condition that the IO request is the read request, the data type identification is a read data identification; and
adding, by the first node, the data type identification into the first index table.

10. The method for reducing the mirror data transmission amount by the dual layer cache according to claim 6, wherein after receiving the IO request from the first upper-layer cache space of the first node, the first upper-layer cache space of the first node of a dual-controller storage device mirrors the IO request to the second upper-layer cache space of the second node.

11. The method for reducing the mirror data transmission amount by the dual layer cache according to claim 10, wherein after the first upper-layer cache space of the first node mirrors the IO request to the second upper-layer cache space of the second node, the method further comprises:
after writing the mirror data of the IO request into the second upper-layer cache space of the second node, recording, by the second upper-layer cache space of the second node, a memory number of a peer node corresponding to a memory number of the second node; and
mirroring a message to the first node to prompt the first node.

12. The method for reducing the mirror data transmission amount by the dual layer cache according to claim 11, wherein after the mirroring a message to the first node to prompt the first node, the method further comprises:
after receiving a mirrored message, recording, by the first node, data received according to the IO request into the cache space of the first node, and recording the memory number of the peer node corresponding to a memory number of the first node.

13. The method for reducing the mirror data transmission amount by the dual layer cache according to claim 9, wherein after the writing mirror data of the first index information in the first lower-layer cache space of the first node into the second lower-layer cache space of the second node, the method further comprises:
in response to a determination that the first node receives a command for clearing cache records, clearing, by the first node, cache data labeled with the read data identification from the first cached data; and
in response to a determination that the second node receives the command for clearing the cache records, clearing, by the second node, invalid data which does not point to the first cached data in the first index information.

14. The method for reducing the mirror data transmission amount by the dual layer cache according to claim 1, wherein after the writing mirror data of the first index information in the first lower-layer cache space of the first node into the second lower-layer cache space of the second node, the method further comprises:
verifying, by reading the first index information in the second lower-layer cache space of the second node, whether the first cached data in the first lower-layer cache space of the first node is found.

15. The method for reducing the mirror data transmission amount by the dual layer cache according to claim 1, further comprising:
dividing a cache space corresponding to a third node into a third upper-layer cache space and a third lower-layer cache space;
after the first node receives the IO request, writing the mirror data of the IO request in the first upper-layer cache space of the first node into the third upper-layer cache space of the third node;
writing the mirror data of the first index information in the first lower-layer cache space of the first node into the third lower-layer cache space of the third node; and
in response to a failure of the second node, clearing cache records of the second node, and synchronizing the first index information of the third node with the first cached data of the first node.

16. The method for reducing the mirror data transmission amount by the dual layer cache according to claim 15, wherein during the dividing a cache space corresponding to a third node into a third upper-layer cache space and a third lower-layer cache space, setting the third upper-layer cache space to be a same size as the first upper-layer cache space, and setting the third lower-layer cache space to be a same size as the first lower-layer cache space.

17. The method for reducing the mirror data transmission amount by the dual layer cache according to claim 15, wherein after the writing the mirror data of the first index information in the first lower-layer cache space of the first node into the third lower-layer cache space of the third node, the method further comprises:
verifying, by reading the first index information in the third lower-layer cache space of the third node, whether the first cached data in the first lower-layer cache space of the first node is found.

18. The method for reducing the mirror data transmission amount by the dual layer cache according to claim 4, wherein the searching, by the second node according to the first index information, for the first cached data stored in the first lower-layer cache space of the first node comprises:
receiving, by the second node, the IO request sent by a requesting end, wherein the IO request comprises an identification of data to be written when the IO request is the write request;
searching, by the second node, for index information of data to be written from the first index information according to the identification of data to be written of the write request; and
sending, by the second node, data pointed to by the index information of the data to be written to the requesting end.

19. A computer device, comprising a memory, a processor and computer programs stored on the memory and executable on the processor, wherein the processor, when executing the computer programs, implements steps of:
dividing a cache space corresponding to a first node into a first upper-layer cache space and a first lower-layer cache space, and dividing a cache space corresponding to a second node into a second upper-layer cache space and a second lower-layer cache space;
after the first node receives an input/output (IO) request, writing the IO request into the first upper-layer cache space;
writing, by the first node, first cached data corresponding to the IO request into the first lower-layer cache space according to the IO request, and generating, by the first node, first index information for the first cached data, wherein the first index information points to the first cached data;

writing mirror data of the IO request in the first upper-layer cache space of the first node into the second upper-layer cache space of the second node; and writing mirror data of the first index information in the first lower-layer cache space of the first node into the second lower-layer cache space of the second node, and not transmitting the first cached data to the second lower-layer cache space of the second node.

20. A computer-readable storage medium, having computer programs stored thereon, wherein the computer programs, when executed by a processor, implement steps of:

dividing a cache space corresponding to a first node into a first upper-layer cache space and a first lower-layer cache space, and dividing a cache space corresponding to a second node into a second upper-layer cache space and a second lower-layer cache space;

after the first node receives an input/output (IO) request, writing the IO request into the first upper-layer cache space;

writing, by the first node, first cached data corresponding to the IO request into the first lower-layer cache space according to the IO request, and generating, by the first node, first index information for the first cached data, wherein the first index information points to the first cached data;

writing mirror data of the IO request in the first upper-layer cache space of the first node into the second upper-layer cache space of the second node; and writing mirror data of the first index information in the first lower-layer cache space of the first node into the second lower-layer cache space of the second node, and not transmitting the first cached data to the second lower-layer cache space of the second node.

\* \* \* \* \*